(12) United States Patent
Mäkelä

(10) Patent No.: US 7,634,343 B2
(45) Date of Patent: Dec. 15, 2009

(54) ACCURATE POSITIONING OF AN UNMANNED MINE VEHICLE USING STATIONARY OBSTACLES

(75) Inventor: Hannu Mäkelä, Helsinki (FI)

(73) Assignee: Sandvik Mining and Construction Oy, Tampere (FI)

( * ) Notice: Subject to any disclaimer, the term of this patent is extended or adjusted under 35 U.S.C. 154(b) by 385 days.

(21) Appl. No.: 10/550,605

(22) PCT Filed: Mar. 25, 2004

(86) PCT No.: PCT/FI2004/000173

§ 371 (c)(1),
(2), (4) Date: Mar. 14, 2006

(87) PCT Pub. No.: WO2004/085219

PCT Pub. Date: Oct. 7, 2004

(65) Prior Publication Data

US 2006/0195237 A1 Aug. 31, 2006

(30) Foreign Application Priority Data

Mar. 25, 2003 (FI) .................................. 20030439

(51) Int. Cl.
| G06F 7/70 | (2006.01) |
| G06F 19/00 | (2006.01) |
| G06G 7/00 | (2006.01) |
| G06G 7/76 | (2006.01) |
| B61K 7/00 | (2006.01) |
| B60T 7/16 | (2006.01) |
| B62D 1/24 | (2006.01) |

(52) U.S. Cl. .................. 701/50; 104/249; 180/168
(58) Field of Classification Search .................. 701/58, 701/60, 61
See application file for complete search history.

(56) References Cited

U.S. PATENT DOCUMENTS

| 3,068,716 | A | * | 12/1962 | Van Dyke ................... 477/104 |
| 3,456,382 | A | * | 7/1969 | Einfalt ........................ 446/445 |
| 3,469,443 | A | | 9/1969 | Moroto et al. |
| 4,316,346 | A | * | 2/1982 | Brand et al. ................. 446/443 |
| 4,885,690 | A | * | 12/1989 | Schimmel et al. ............. 701/54 |
| 5,099,942 | A | * | 3/1992 | Kushi et al. ................. 180/197 |
| 5,164,648 | A | * | 11/1992 | Kita et al. ................... 318/587 |
| 5,211,115 | A | * | 5/1993 | Maier et al. ................. 104/288 |
| 5,850,341 | A | * | 12/1998 | Fournier et al. .............. 701/50 |
| 6,317,671 | B1 | * | 11/2001 | Tsutsui et al. ................ 701/51 |
| 6,450,281 | B1 | * | 9/2002 | Kohler et al. ............... 180/197 |

FOREIGN PATENT DOCUMENTS

EP 0 412 463 2/1991

(Continued)

Primary Examiner—Thomas G Black
Assistant Examiner—Sze-Hon Kong
(74) Attorney, Agent, or Firm—Drinker Biddle & Reath LLP

(57) ABSTRACT

A method and system for stopping an unmanned mine vehicle in a predetermined position. The mine vehicle is driven at a low speed towards a physical. When the mine vehicle encounters the obstacle (7, 7a, 7b), a speed difference greater than a predetermined limit value is generated between the speed of the mine vehicle and the driving power transmission. The control system of the mine vehicle detects the exceeding of the limit value and stops the vehicle.

15 Claims, 2 Drawing Sheets

FOREIGN PATENT DOCUMENTS

| | | |
|---|---|---|
| EP | 1 405 753 | 4/2004 |
| JP | 60/255551 | 12/1985 |
| JP | 63/308611 | 12/1988 |
| JP | 63308611 A * | 12/1988 |
| RU | 2 130 599 | 5/1999 |
| WO | 01/31168 | 5/2001 |

* cited by examiner

ACCURATE POSITIONING OF AN UNMANNED MINE VEHICLE USING STATIONARY OBSTACLES

FIELD OF THE INVENTION

The invention relates to a method of stopping an unmanned mine vehicle in a predetermined position, the mine vehicle being controlled by means of a control system comprising at least a first control unit in the mine vehicle, a second control unit outside the mine vehicle and a data transmission connection between said control units, and the method comprising: driving the mine vehicle, controlled by its control system, towards a predetermined position; and monitoring at least the speed of the mine vehicle and the speed of the driving power transmission of the mine vehicle.

Further, the invention relates to a system for stopping an unmanned mine vehicle in a predetermined position, the system comprising: at least a control unit including at least a first control unit in the mine vehicle; a second control unit outside the mine vehicle and a data transmission connection between said control units; and means for monitoring the speed of the mine vehicle and the speed of the driving power transmission of the mine vehicle.

The invention further relates to a system for stopping an unmanned mine vehicle in a predetermined position, the system comprising a control system including at least a control unit in the mine vehicle.

BACKGROUND OF THE INVENTION

Various unmanned mine vehicles are increasingly used in mines, which vehicles are controlled by remote control from a monitoring room or which may operate independently in a mine according to their own navigation systems and an operating plan concerning the vehicles. There are situations where it is necessary to be able to stop an unmanned mine vehicle accurately. For example transport vehicles and, on the other hand, loading vehicles must be stopped in a certain position on the loading site in order for the loading of broken rock material to be successful. This imposes great requirements for the control systems of unmanned mine vehicles. It is, however, very difficult and expensive to construct control systems capable of extremely accurate stopping in demanding mine conditions. Furthermore, the control system easily becomes complex and sensitive to failures.

BRIEF DESCRIPTION OF THE INVENTION

An object of the present invention is to provide a novel and an improved arrangement for stopping an unmanned mine vehicle very accurately in a predetermined position.

A method according to the invention is characterized by driving the mine vehicle at a speed significantly lower than the normal driving speed against at least one physical obstacle that is arranged in a predetermined position; and stopping the mine vehicle when the ratio of the speed of the driving power transmission to the speed of the mine vehicle exceeds a predetermined limit value.

A system according to the invention is characterized in that the system further comprises: at least one physical obstacle arranged in a predetermined position, against which the mine vehicle is arranged to be driven; and means for stopping the mine vehicle when the ratio of the speed of the driving power transmission of the mine vehicle to the speed of the vehicle exceeds a predetermined limit value.

A second system according to the invention is characterized in that the system further comprises: at least one physical obstacle arranged in a predetermined position, against which the mine vehicle is arranged to be driven; means for determining the tractive resistance of the mine vehicle when said obstacle is approached; and further, means for stopping the mine vehicle when the tractive resistance exceeds a predetermined limit value.

An essential idea of the invention is that an unmanned mine vehicle is driven at a speed significantly lower than the normal driving speed towards a physical obstacle that is positioned in a predetermined position. At the same time, the speed of the mine vehicle and the speed transmitted from the driving power transmission of the vehicle are monitored. When the mine vehicle encounters the obstacle, the obstacle resists the proceeding of the vehicle. As a result of the tractive resistance, a speed difference is generated between the speed of the mine vehicle and the speed of the driving power transmission. In the control system of the mine vehicle, a limit value has been set for the speed difference. When the control system detects that the limit value has been exceeded, it concludes that the mine vehicle has been driven against the obstacle, after which it stops the vehicle.

An advantage of the invention is that the stopping system is rather simple to implement. Further, the system is reliable, because stopping is based on using a physical obstacle. The location of the obstacle determines the precise stopping point, whereby the location determination does not necessarily require complex positioning systems or heavy processing of the location information. Furthermore, no failure-sensitive proximity sensors or other corresponding components are needed in the system. Owing to its simplicity, the system according to the invention is also inexpensive. Also, the system according to the invention may be applied relatively easily to present unmanned mines already in use.

The essential idea of an embodiment of the invention is that the speed of the traction wheels of the vehicle is monitored, and if the speed difference between the speed of at least one traction wheel and the speed of the vehicle exceeds a predetermined limit, the mine vehicle is concluded to be against the obstacle. The speed of the vehicle can be determined by monitoring the speed of the wheels rolling freely. Monitoring the wheel speeds is relatively simple.

The essential idea of an embodiment of the invention is that the obstacle is approached at a decelerating speed. Thus, when the vehicle collides with the obstacle, no damage is caused for the vehicle or obstacle.

The essential idea of an embodiment of the invention is that at least one wheel of the mine vehicle is driven against the obstacle.

The essential idea of an embodiment of the invention is that the frame of the mine vehicle is driven against the obstacle.

BRIEF DESCRIPTION OF THE FIGURES

The invention will be explained in more detail in the attached drawings, of which

DETAILED DESCRIPTION OF THE INVENTION

Figure 1:
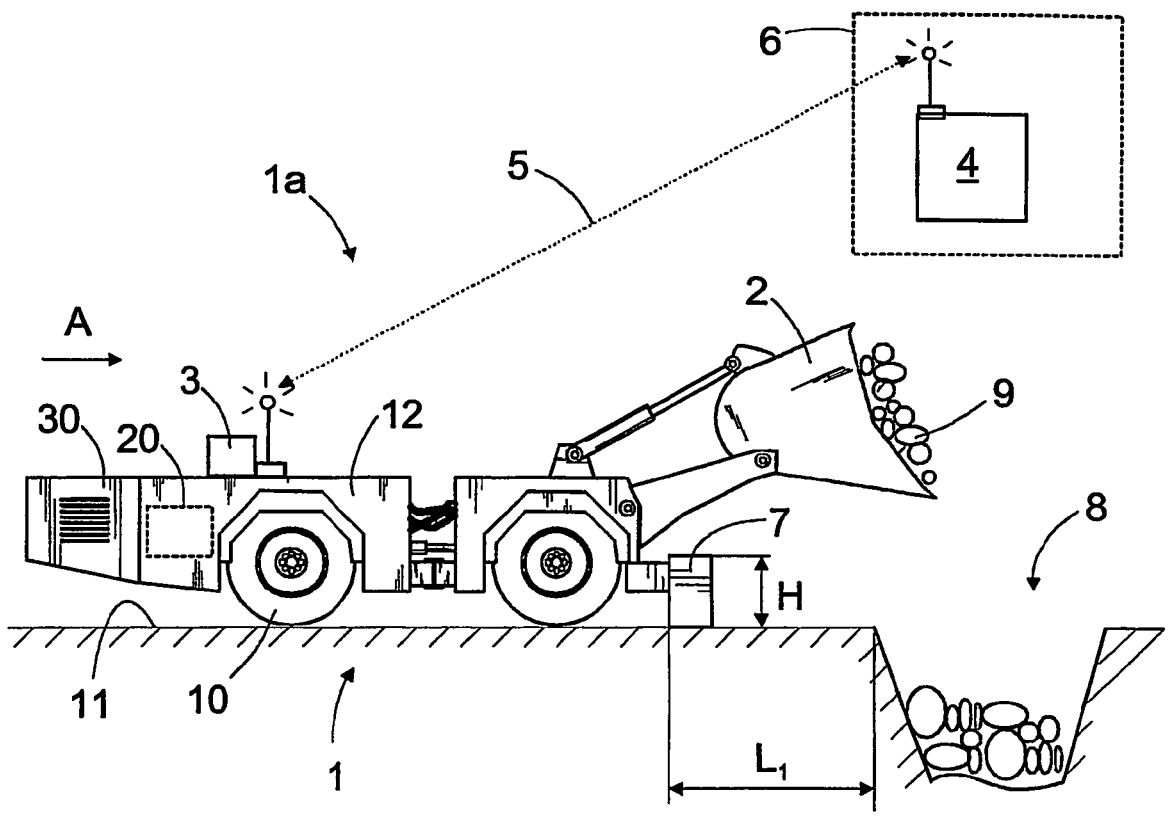
FIG. 1 shows schematically a side view of an unmanned mine vehicle according to the invention, stopped in a manner according to the invention in a predetermined position.

FIG. 1 shows an unmanned mine vehicle 1, in this case a loading vehicle 1a, which is a kind of wheel loader, there being a bucket 2 in its front part, with which crushed material can be transported from one place to another and loaded to other transport means, such as conveyors and transport vehicles 1b. The mine vehicle 1 comprises a first control unit 3, which is in connection with an outside second control unit 4 by means of a data transmission connection 5. The second control unit 4 may be arranged for instance in a monitoring room 6 outside the mine. Both the first control unit 3 and the second control unit 4 may be computers, in which computer programs intended for controlling the mine vehicle can be run. The data transmission connection 5 between the control units 3 and 4 may be either wired or wireless.

In FIG. 1, the loading vehicle 1a is stopped against an obstacle 7, at an appropriate distance from a pass chute 8, in which the bucket 2 of the loading vehicle 1a is intended to be emptied. The obstacle 7 is positioned at a distance $L_1$ from the chute 8, whereby the rock material 9 can be dropped from the bucket 2 directly into the chute 8 or, for instance, to a conveyor. The distance $L_1$ is mainly affected by the dimension of the loading vehicle 1a itself. The height H of the obstacle 7 is dimensioned in such a way that the bucket 2 can be guided over it without difficulties. When the vehicle 1a has collided with the obstacle 7 in the driving direction A, its speed is substantially zero. The traction wheels 10 of the vehicle 1a, by contrast, continue to roll at the original speed at least for a moment. Subsequently, either power transmission 20 compensates for the generated speed difference or the wheels begin to slip on a surface 11 where the vehicle is driven. The stopping system according to the invention detects that the speed difference generated between the vehicle frame 12 and the wheels 10 has exceeded a predetermined limit value, and it stops the vehicle. The system may also automatically put the driving gear into neutral gear and engage the brakes. The mine vehicle 1 exits this position only after it has received instructions for it from the control unit 3.

A limit value for the allowed speed difference may be set in the control system of the mine vehicle 1. The allowed speed difference of the speed of the driving power transmission 20, such as a gear system, traction wheels 10 and other components to be monitored, in relation to the speed of the vehicle may be determined in such a way that changes in speed due to the quality of the surface 11 or steering of the vehicle 1 are not interpreted as stopping against the obstacle 7. It is possible that the speed monitoring is not switched on before the mine vehicle 1 begins to approach the obstacle.

Further, the control system may be arranged to monitor the rotation speed of the motor 30 of the vehicle 1. When the mine vehicle 1 is driven at a particular gear, usually at the lowest gear, against the obstacle 7, the tractive resistance grows, due to which the anti-slip regulation of the power transmission 20 of the mine vehicle 1 begins to limit the torque to be transmitted to the wheels. For example a torque converter, a clutch or a corresponding component belonging to the power transmission may be arranged to slip. When the loading thus decreases, the rotation speed of the motor 30 may increase. The control system detects the increase in the rotation speed and stops the mine vehicle 1.

The stopping system according to the invention may be a computer program that can be executed in a computer belonging to the control system of the mine vehicle. The computer program may be stored in the memory of the control system or it may be loaded there from a memory device or a data network.

Figure 2:
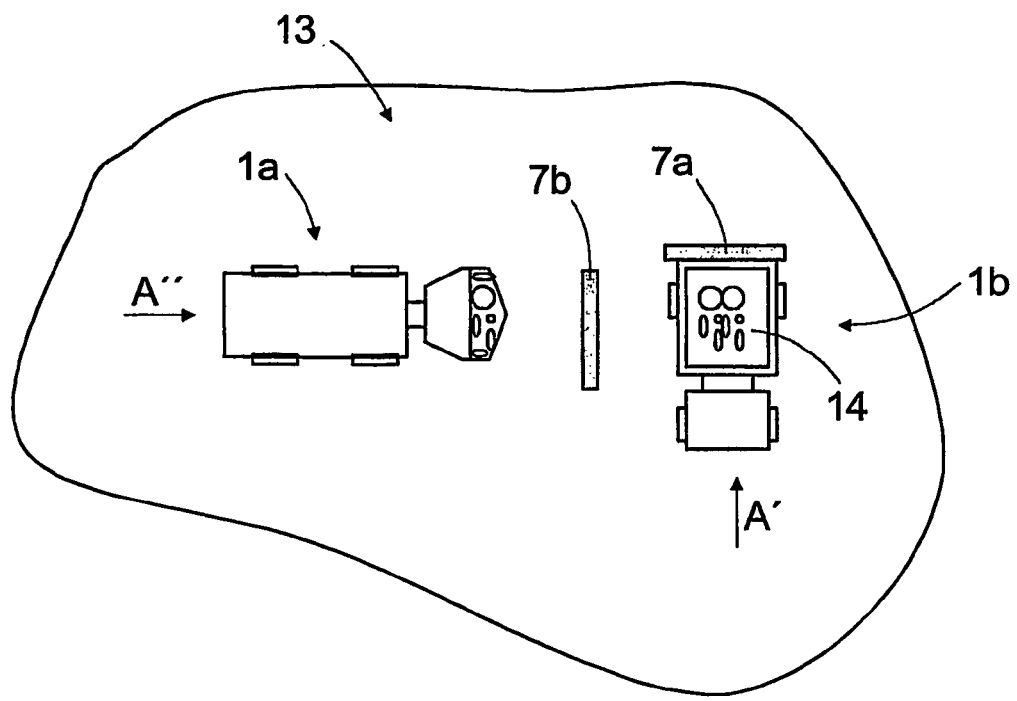
FIG. 2 shows schematically a top view of a loading site where stopping according to the invention is applied.

FIG. 2 shows a loading site 13, where the transport vehicle 1b, i.e. what is called a dumper, is stopped according to the invention in a predetermined position to wait for loading. The loading site 13 has a first obstacle 7a, against which the transport vehicle 1b has been driven in direction A'. Further, a second obstacle 7b has been arranged on the loading site 13, towards which the loading vehicle 1a is driven in direction A", i.e. in the transverse direction relative to the transport vehicle 1b. In this way, the loading vehicle 1a and the transport vehicle 1b can be stopped accurately in a predetermined position relative to each other, whereby the bucket 2 of the loading vehicle 1a can be emptied accurately to the platform 14 of the transport vehicle 1b. An advantage of the system is that it does not require complex means for determining the locations of the vehicles. The mine vehicles 1 are stopped in their longitudinal directions, either by driving forwards or alternatively by backing up. The control system attends to the vehicles being stopped correctly in the lateral direction.

Figure 3:
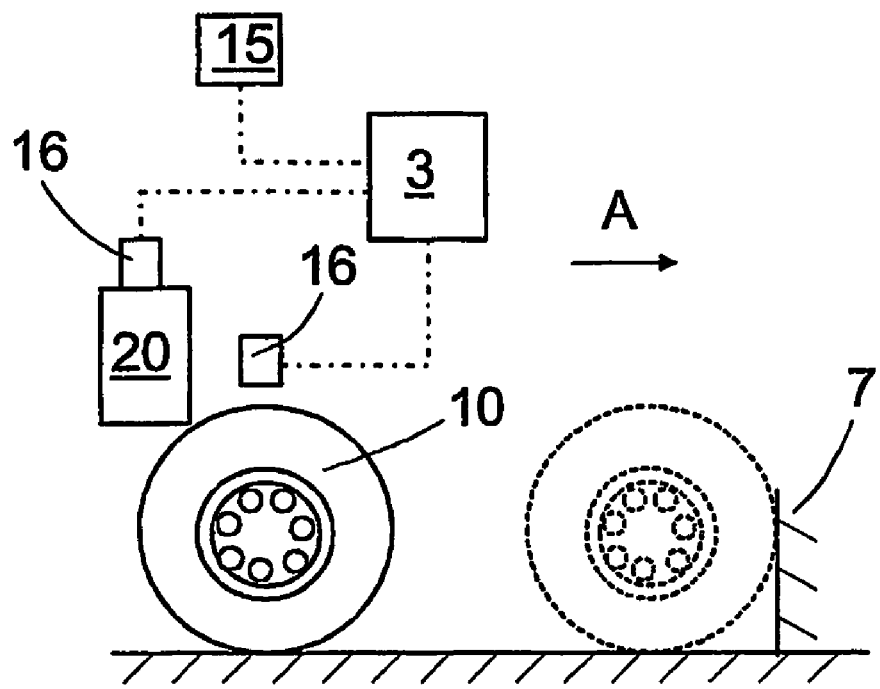
FIG. 3 shows schematically a side view of an embodiment of the solution according to the invention.

In FIG. 3, the wheel 10 of the mine vehicle 1 is driven in the way shown by a broken line against the physical obstacle 7. In this case, the obstacle 7 is dimensioned so low that the platform 14, the bucket 2 or the frame 12 of the mine vehicle 1 does not hit it. On the other hand, the height of the obstacle 7 must be such that the wheel 10 cannot rise over it. The solid-rubber or inflated wheel 10 may yield somewhat when it hits the obstacle 7, and the wheel 10 may thus dampen the collision forces to some extent. Further, since the location of the obstacle is known to the control system of the mine vehicle 1, the vehicle 1 can approach the obstacle 7 at a decelerating speed. The closer to the obstacle 7 the vehicle 1 is, the lower the speed of the vehicle 1. The speed can be lowered continuously or, alternatively, step by step.

FIG. 3 further shows an arrangement where a member 15 monitoring the speed of the mine vehicle 1 and, correspondingly, one or more members 16 monitoring the speed of the traction wheels 10 of the vehicle transmit measurement data to the first control unit 3, which calculates, on the basis of the measurement data, the speed differences between the vehicle 1 and the wheels 10 and compares them to the limit values that have been given to the control unit 3 beforehand. Alternatively, the speed of the vehicle and the speed transmitted via components of the driving power transmission 20, such as the gear system, may be monitored. Further, the rotation speed of the vehicle motor may be measured, and the speed of the driving power transmission 20 may be found out on the basis of the driving gear used. The speed of the vehicle 1 can be determined for instance by measuring the speed of the wheels rolling freely. Further, suitable measuring devices, such as laser and radar, may be used. It is also possible to determine the speed of the vehicle 1 by comparing the video image of the shape of the mine surface, transmitted from the vehicle 1, with another video image that is stored in the memory of the control system. It can be mentioned that the stopping system may utilize sensors of the anti-slip regulation and other possible devices related to measuring the speed.

Figure 4:
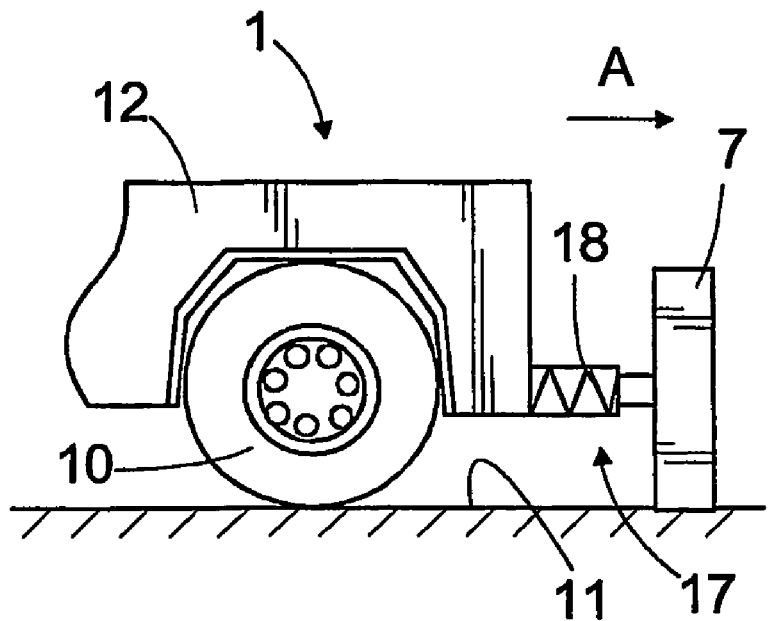
FIG. 4 shows schematically a second embodiment of the system according to the invention.

In FIG. 4, the frame 12 of the mine vehicle has been driven against the obstacle 7. As seen from FIG. 4, the obstacle 7 may be a fixed wall or border arranged on the floor 11 of the mine and encased in concrete, for example. As seen from the figure, the mine vehicle 1 may comprise a bumper 17 provided with a damper 18. Owing to the damper 18, the contact between the mine vehicle 1 and the obstacle 7 may be softer. Alternatively, the obstacle 7 may be provided with an appropriate damper.

The obstacle 7 may be formed fixedly in a desired place, for instance by encasing in concrete, or alternatively, the obstacle may be a movable structure which remains in place due to its own mass, or the obstacle 7 may be provided with suitable fixing members that stand the collision forces generated in the stopping and prevent the obstacle 7 from moving in the driving direction A of the mine vehicle 1. It is also possible to arrange the obstacle 7 in such a way that it can be moved by remote control. Thus, the obstacle 7 may be lowered with a hydraulic cylinder so that it is not in the way of the transport vehicle 1b when the loading is completed. Thus, the vehicle can be driven from the loading site to the discharge site without having to back up.

Further, the system according to the invention can be used for driving an unmanned mine vehicle to a reference point. Obstacles of the type described above may be formed for an unmanned mine, the locations of which are known to the control system. When the mine vehicle is driven against an obstacle, the accurate location of the mine vehicle can be updated for the control system. Further, the method according to the invention can be utilized for stopping a mine vehicle in a predetermined position in a mine for maintenance and battery charge.

The tractive resistance of a mine vehicle can also be measured in ways other than the ones described above. One option is to measure the torque transmitted by the power transmission. A second option is to monitor clutches belonging to the anti-slip regulation and other components of the power transmission. Yet a third option is to provide the bumper of a mine vehicle or the like with force sensors which, when approaching the obstacle, detect that the tractive resistance has increased.

The drawings and the related description are only intended to illustrate the idea of the invention. The details of the invention may vary within the claims.

The invention claimed is:

1. A method of stopping an unmanned mine vehicle in a predetermined position, the mine vehicle being controlled by means of a control system comprising at least a first control unit in the mine vehicle, a second control unit outside the mine vehicle and a data transmission connection between said control units,
   and the method comprising:
   driving the mine vehicle, controlled by said control system, towards a predetermined position;
   monitoring at least a speed of the mine vehicle and a speed of the driving power transmission of the mine vehicle,
   driving the mine vehicle at a speed significantly lower than a normal driving speed and driving intentionally against at least one physical stationary obstacle that is arranged in a predetermined position wherein the mine vehicle collides with the obstacle;
   and stopping the driving power of the mine vehicle when a ratio of the speed of the driving power transmission to the speed of the mine vehicle exceeds a predetermined limit value as a result of a tractive resistance caused by the obstacle resisting the proceeding of the mine vehicle after collision.

2. A method according to claim 1, comprising
   monitoring the speed of traction wheels;
   and stopping the mine vehicle when the ratio of the speed of at least one traction wheel to the speed of the mine vehicle exceeds a predetermined limit value.

3. A method according to claim 1, comprising
   monitoring a rotation speed of a motor of the mine vehicle when the vehicle is driven at a given gear of a driving power transmission against the obstacle;
   and stopping the mine vehicle when the ratio of the rotation speed of the motor to the speed of the mine vehicle exceeds a limit value defined according to a gear used.

4. A method according to claim 1, comprising
   driving the mine vehicle at a decelerating speed against the obstacle.

5. A method according to claim 1, comprising
   driving at least one wheel of the mine vehicle against the obstacle.

6. A method according to claim 1, comprising
   driving the frame of the mine vehicle against the obstacle.

7. A system for stopping an unmanned mine vehicle in a predetermined position, the system comprising:
   a control unit including at least a first control unit in the mine vehicle;
   a second control unit outside the mine vehicle;
   a data transmission connection between said control units;
   means for monitoring a speed of the mine vehicle and a speed of a driving power transmission of the mine vehicle,
   at least one physical stationary obstacle arranged in a predetermined position, against which the mine vehicle is arranged to be driven intentionally and to collide with the obstacle;
   and means for stopping a driving power of the mine vehicle when a ratio of the speed of the driving power transmission of the mine vehicle to a speed of the vehicle exceeds a predetermined limit value as a result of a tractive resistance caused by the obstacle resisting the proceeding of the mine vehicle after the collision.

8. A system according to claim 7, wherein
   the system comprises members for monitoring speed of the traction wheels of the vehicle and for determining a speed of the driving power transmission.

9. A system according to claim 7, wherein
   the system comprises means for monitoring a rotation speed of the motor of the mine vehicle;
   and the system is arranged to stop the mine vehicle when a ratio of the rotation speed of the motor to the speed of the mine vehicle exceeds a limit value defined according to a gear used.

10. A system for stopping an unmanned mine vehicle in a predetermined position, the system comprising:
    a control system including at least a control unit in the mine vehicle;
    at least one physical stationary obstacle arranged in a predetermined position, against which the mine vehicle is arranged to be driven intentionally and to collide with the obstacle;
    means for determining tractive resistance of the mine vehicle when said obstacle is approached;
    and means for stopping a driving power of the mine vehicle when the tractive resistance exceeds a predetermined limit value after the collision against the obstacle.

11. A system according to claim 10, wherein
    the system comprises means for determining a speed of the mine vehicle;
    the system comprises means for monitoring a rotation speed of a motor of the mine vehicle;
    and the system is arranged to stop the mine vehicle when a ratio of the rotation speed of the motor to the speed of the mine vehicle exceeds a limit value defined according to a gear used.

12. A system according to claim 10, wherein
    the system comprises members for monitoring speed of the traction wheels of the vehicle and for determining a speed of the driving power transmission.

13. A system according to claim 7 wherein the system comprises at least one physical stationary reference obstacle arranged in a location known to the control system, and when the mine vehicle is driven against the reference obstacle in the known location, the location of the mine vehicle is updated for the control system.

14. A system according to claim 7 wherein the mine vehicle is a wheel loader comprising a bucket for transporting broken rock material from a loading place to an unloading place, the physical stationary obstacle is arranged in a predetermined distance from the unloading place, and the wheel loader is driven against the physical stationary obstacle and bucket of the wheel loader is emptied.

15. A system according to claim 7, wherein the system comprises at least one loading vehicle provided with a bucket and at least one transport vehicle provided with a platform, the system comprises a loading site wherein the loading vehicle is arranged to load broken rock material to the transport vehicle, the loading site comprises a first physical stationary obstacle against which the transport vehicle is driven and a second physical obstacle against which the loading vehicle is driven, and the positions of the transport vehicle and the loading vehicle relative to each other is determined by the relative positions of the first and second physical stationary obstacles.

* * * * *